US009834480B2

(12) United States Patent
Mamada et al.

(10) Patent No.: US 9,834,480 B2
(45) Date of Patent: Dec. 5, 2017

(54) GYPSUM-BASED EMBEDDING MATERIAL COMPOSITION FOR CASTING

(71) Applicant: YOSHINO GYPSUM CO., LTD., Tokyo (JP)

(72) Inventors: Emi Mamada, Tokyo (JP); Kenichi Sugano, Tokyo (JP); Masato Yoshikane, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 504 days.

(21) Appl. No.: 14/390,909

(22) PCT Filed: Apr. 17, 2013

(86) PCT No.: PCT/JP2013/061409
§ 371 (c)(1),
(2) Date: Oct. 6, 2014

(87) PCT Pub. No.: WO2013/161643
PCT Pub. Date: Oct. 31, 2013

(65) Prior Publication Data
US 2015/0080207 A1    Mar. 19, 2015

(30) Foreign Application Priority Data

Apr. 27, 2012   (JP) .................................. 2012-102089

(51) Int. Cl.
| | | |
|---|---|---|
| *C04B 35/16* | (2006.01) | |
| *B22C 9/04* | (2006.01) | |
| *B22C 1/08* | (2006.01) | |

(52) U.S. Cl.
CPC ............. *C04B 35/16* (2013.01); *B22C 1/08* (2013.01); *B22C 9/04* (2013.01); *C04B 2235/3427* (2013.01); *C04B 2235/3895* (2013.01)

(58) Field of Classification Search
CPC ...... A61K 6/0625; A61K 6/0662; C04B 7/04; C04B 14/365; C04B 18/0445
See application file for complete search history.

(56) References Cited

U.S. PATENT DOCUMENTS

| | | |
|---|---|---|
| 3,303,030 A | 2/1967 | Preston |
| 3,436,236 A | 4/1969 | Gambler et al. |
| 4,146,670 A | 3/1979 | Rogers |
| 4,284,121 A | 8/1981 | Horton |
| 4,529,028 A | 7/1985 | Dybala et al. |
| 4,696,455 A | 9/1987 | Johnson |
| 4,814,011 A * | 3/1989 | Kamohara ................ B22C 1/00 106/35 |
| 5,373,891 A * | 12/1994 | Kato .................... A61K 6/0625 106/35 |
| 6,258,813 B1 | 7/2001 | Arlt et al. |
| 6,949,136 B2 | 9/2005 | Horton et al. |
| 2004/0256081 A1 | 12/2004 | Kato |
| 2011/0159451 A1 | 6/2011 | Kuo et al. |
| 2015/0136350 A1 | 5/2015 | Mamada et al. |

FOREIGN PATENT DOCUMENTS

| | | |
|---|---|---|
| DE | 19918316 | 12/1999 |
| JP | 54-136525 | 10/1979 |
| JP | 3-220638 | 8/1987 |
| JP | 4-037435 | 2/1992 |
| JP | 4-330006 | 11/1992 |
| JP | 11-076270 | 3/1993 |
| JP | 6-336409 | 12/1994 |
| JP | 7-164096 | 6/1995 |
| JP | 7-103006 B | 11/1995 |
| JP | 9-192777 | 7/1997 |
| JP | 9-299385 | 11/1997 |
| JP | 10-113746 | 5/1998 |
| JP | 11-226695 | 8/1999 |
| JP | 2001-500142 | 1/2001 |
| JP | 2002-087918 | 3/2002 |
| JP | 2002-235277 | 8/2002 |
| JP | 2003-034608 | 2/2003 |
| KR | 2002-0090474 | 12/2002 |

OTHER PUBLICATIONS

Korean Office Action, issued in the corresponding Korean patent application No. 10-2014-7033256, dated Nov. 25, 2015, 4 pages.
Korean Office Action, issued in the corresponding Korean patent application No. 10-2015-7001006, dated Nov. 30, 2015, 5 pages.

* cited by examiner

*Primary Examiner* — Noah S Wiese
(74) *Attorney, Agent, or Firm* — Hamre, Schumann, Mueller & Larson, P.C.

(57) ABSTRACT

"A gypsum-based embedding material" is provided with which favorable casting can be conducted not only in the case where a conventional wax pattern is used, but also, in particular, in the case where a resin pattern different from the conventional wax pattern in disappearance temperature and disappearance behavior is used, and with which, although being a "gypsum-based embedding material", occurrence of cracks, breakage, or the like in a mold is suppressed even when casting is conducted by "rapid heating" excellent in treatment efficiency. The gypsum-based embedding material composition for casting comprising, as main components, calcined gypsum as a binder, cristobalite and quartz as heat-expandable refractory materials, and a non-heat-expandable refractory material having an average particle diameter of 5 to 20 μm, the blending amount of the non-heat-expandable refractory material in 100 parts by mass of the main components being 10 to 25 parts by mass.

6 Claims, No Drawings

GYPSUM-BASED EMBEDDING MATERIAL COMPOSITION FOR CASTING

TECHNICAL FIELD

The present invention relates to a gypsum-based embedding material composition for casting, and more specifically relates to a gypsum-based embedding material composition for casting applicable to both of a wax pattern and a resin pattern and also adaptable to both of usual heating and rapid heating regarding a heating system in casting.

BACKGROUND ART

In dental treatment, a dental prosthesis (such as an inlay, a crown, and an artificial tooth) comprising a material such as a metal having a complicated shape adaptable to each patient is generally used. As one of the methods for casting a metal that have long been conducted in manufacturing not only dental prostheses but also jewelry, fine arts and crafts, parts, or the like having a sophisticated and complicated shape, there is a lost wax process of precision casting. In the case where the prosthesis or the like is manufactured by the lost wax process, a part (object) where a patient is in need for is shaped in the first place using an impression material, and, based on this, a dental gypsum model is made. And a technician precisely manufactures a model the shape of which is the same as the object from the dental gypsum model with wax by hand, the embedding material comprising a refractory material is poured into the surroundings of the obtained wax pattern (wax model) and hardened, and then heating is conducted to form a mold by causing the wax pattern to disappear (to be lost) (incineration or dewaxing). Thereafter, a molten metal is poured into the space of the formed mold, and a cast is taken out by breaking the mold after cooling to obtain the intended prosthesis or the like having a complicated shape.

Amid the times when the image analysis technology has advanced by leaps and bounds, the technology by which a sophisticated image data is obtained by three-dimensionally scanning the gypsum model manufactured in the manner as described above, the prosthesis or the like is digitally portrayed on a PC, and a resin pattern is output as a mechanically precise stereo image using a 3D printer has been developed and utilized in recent years. It is anticipated that the technology spreads with the advance of the image analysis technology in the future. In this case, heating is conducted using the resin pattern that has been output as a stereo image in place of the above-described wax pattern to form a mold by causing the resin pattern to disappear (to be lost), and the subsequent processes are to be conducted.

The embedding materials for use in the above-described technology comprising different materials are used depending on the kind of metal to be cast. Representative examples of the embedding material include "gypsum-based embedding materials", "phosphate-based embedding materials", "silica-based embedding materials", and so on. The "gypsum-based embedding materials" are used for casting a metal having a relatively low melting point. More specifically, in the case where casting is conducted with a metal having a melting point of 1100° C. or less (within a range of noble metal alloy that can be melted with a gas burner) such as, for example, silver (Ag)-based alloy and palladium alloy including gold-palladium alloy (Au—Ag—Pd), the "gypsum-based embedding materials" are used. On the other hand, in the case where casting is conducted with a metal having a melting point of more than 1100° C. such as, for example, cobalt-chromium (Co—Cr)-based alloy and a nickel-chromium (Ni—Cr)-based alloy having a melting point of 1200° C. to 1400° C., the "phosphate-based embedding materials" are used. Among others, although the "gypsum-based embedding materials" are inferior to the "phosphate-based embedding materials" in casting properties at a high temperature, the "gypsum-based embedding materials" have advantages of being excellent in a taking-out property of a cast and operability (fluidity) and providing less deformation due to residual stress and less change with time, and are widely used.

In recent years, the heating process in forming a mold by pouring and hardening the above-described embedding material, and thereafter causing the wax pattern or the like to disappear (to be lost) (incineration or dewaxing) by heating has been changed from the "usual heating" in which the temperature of an electric furnace is gradually raised from room temperature to a target temperature to the "rapid heating" in which a molding material is placed in an furnace having a target temperature to immediately start casting from the standpoint of treatment efficiency. Therefore, the embedding material is required not to cause cracks, breakage, damage, or the like even when subjected to the rapid heating. To meet the requirement, since metals as listed above each have a different coefficient of contraction when solidified, an embedding material having a coefficient of expansion to compensate for the coefficient of contraction of a metal, the embedding material containing cristobalite or quartz is used. On the other hand, there is a problem that the embedding material should be the one that is capable of preventing the occurrence of cracks, breakage, or the like liable to occur by the expansion being too large in order for the embedding material to be applicable to the above-described rapid heating. Moreover, as described previously, since the "gypsum-based embedding materials" in particular have excellent properties but are inferior to the "phosphate-based embedding materials" in casting properties at a high temperature, the "phosphate-based embedding materials" are used in the case where the "rapid heating" is conducted using a resin pattern. Accordingly, when a "gypsum-based embedding material" that is applicable to the "rapid heating" using a resin pattern is provided, the "gypsum-based embedding material" is extremely useful. In addition, the incineration temperature to cause the pattern to disappear in the conventional technology is taken as 700 to 750° C. in the case of using a gypsum-based embedding material and 800 to 900° C. in the case of using a phosphate-based embedding material.

Against the above-described circumstances, proposals as described below have been made in the past. There is a proposal on a gypsum-based embedding material that does not cause cracks, breakage, damage, or the like even when subjected to rapid heating, the gypsum-based embedding material comprising, as main components, for example, calcined gypsum, and cristobalite and quartz each having a particular average particle diameter, to which an inorganic salt and a powdered refractory material having an average particle diameter larger than the above-described average particle diameter of the cristobalite and the quartz are added as components for increasing air permeability (see, Patent Literature 1). Moreover, there is a proposal on a gypsum-based embedding material for casting comprising a heat-insulating material and hemihydrate gypsum, the gypsum-based embedding material being applicable to casting at a high temperature by adding an MgO—Al$_2$O$_3$ spinel as a heat-insulating material (see, Patent Literature 2). Moreover, there is a proposal that, by adding calcium carbonate to main components comprising hemihydrate gypsum and a heat-insulating material, the air permeability is improved and the occurrence of cracks in a mold and burrs in a cast due to generation of a gas through the decomposition of calcined gypsum or wax in calcination at a high temperature are suppressed (see, Patent Literature 3). Moreover, there is a proposal that, by replacing a part of quartz or cristobalite excellent in performance to compensate for the coefficient of contraction of a metal with tridymite in the gypsum-based embedding material or phosphate-based embedding material, the rapid heating of a dental mold is made possible, the time required for the disappearance of a wax pattern and the time required for the preheating of a mold at the time of casting is largely shortened, and casting with high precision is made possible (see, Patent Literature 4). According to the studies made by the present inventors, although the above-described tridymite the rise in the coefficient of thermal expansion of which is calmer when compared with cristobalite, the tridymite is not different from the cristobalite in that it is a heat-expandable refractory material.

CITATION LIST

Patent Literature

Patent Literature 1: Japanese Patent Publication No. 7-103006
Patent Literature 2: Japanese Patent Laid-Open No. 10-113746
Patent Literature 3: Japanese Patent Laid-Open No. 2002-87918
Patent Literature 4: Japanese Patent Laid-Open No. 6-336409

SUMMARY OF INVENTION

Technical Problem

Against the above-described circumstances, when the technology: that makes the "gypsum-based embedding material" adaptable to the aforementioned "rapid heating" to say nothing of the "usual heating"; and by which favorable casting can be conducted even in the case where the technology is applied to the aforementioned resin pattern the evolution of which has been expected in recent years, to say nothing of the case where the technology is applied to the wax pattern. However, according to the studies made by the present inventors, in the case where the resin pattern is used in place of the wax pattern, it is necessary to make the heating temperature higher than the heating temperature in the case of causing the wax pattern to disappear for the purpose of causing the resin pattern to completely disappear, and, besides, the disappearance behavior of the resin pattern is totally different from that of the conventional wax pattern. Furthermore, although the suitable "gypsum-based embedding materials": that are adaptable to the rapid heating conducted to achieve the improvement in treatment efficiency; that do not cause cracks, breakage, or the like in a mold; and with which a cast excellent in dimensional accuracy can be obtained have been studied and proposed as described previously, any of them has not been intended to apply to the resin pattern and has not sufficiently been adaptable to the resin pattern. Against this problem, when a "gypsum-based embedding material" that is applicable to the resin pattern in the rapid heating system can be provided, the practical value thereof is extremely high.

Accordingly, an object of the present invention is to provide a "gypsum-based embedding material" with which favorable casting can be conducted not only in the case where the conventional wax pattern is used but also, in particular, in the case where the resin pattern different from the wax pattern in disappearance temperature and disappearance behavior is used. Furthermore, another object of the present invention is to provide a "gypsum-based embedding material" with which, although being a "gypsum-based embedding material", the occurrence of cracks, breakage, or the like in a mold is suppressed even when casting is conducted by "rapid heating" excellent in treatment efficiency, and with which a cast to be obtained is made so as to have a desired and favorable size and the surface of the cast is made so as to be smooth and glossy without burrs and roughness.

Solution to Problem

The above-described objects can be achieved by the following present invention. Namely, the present invention provides a gypsum-based embedding material composition for casting, comprising, as main components: calcined gypsum as a binder; cristobalite and quartz as heat-expandable refractory materials; and a non-heat-expandable refractory material having an average particle diameter of 5 to 20 µm, wherein the blending amount of the non-heat-expandable refractory material in 100 parts by mass of the main components is 10 to 25 parts by mass.

Examples of the preferable embodiments of the present invention include the followings. Namely, the non-heat-expandable refractory material is one or more selected from the group consisting of fused silica, mullite, zircon, and alumina; both of the cristobalite and the quartz have an average particle diameter of 5 to 20 µm; the blending ratios of respective main components are 25 to 40 parts by mass for the calcined gypsum, 15 to 40 parts by mass for the cristobalite, 15 to 30 parts by mass for the quartz, and 10 to 25 parts by mass for the non-heat-expandable refractory material in the case where the total amount of the main components is 100 parts by mass; and the embedding material composition for casting is for dental casting.

Advantageous Effects of Invention

According to the present invention, a useful "gypsum-based embedding material" applicable to "rapid heating" is provided with which favorable casting can be conducted even in the case where a resin pattern different from a conventional wax pattern in disappearance temperature and disappearance behavior is used to say nothing of the case where the conventional wax pattern is used, and furthermore, even in the case where casting is conducted by "rapid heating", with which occurrence of cracks, breakage, damage, or the like of a mold is suppressed and applicable to "rapid heating". More specifically, according to the present invention, a "gypsum-based embedding material" is provided with which a formed mold is made so that the occurrence of cracks, breakage, or the like in a formed mold is suppressed, and with which a cast obtained using the mold has a desired size and a surface of the cast becomes smooth and glossy without burrs and roughness. A gypsum-based embedding material composition for casting provided by the present invention is effective particularly for dental casting, and it becomes possible to obtain a favorable dental prosthesis to be necessary for dental treatment in a good yield by using the gypsum-based embedding material composition for casting.

DESCRIPTION OF EMBODIMENTS

Hereinafter, the present invention will be described in more detail giving preferable embodiments. The present inventors have made diligent studies on the blending materials and the blending amounts thereof to solve the above-described problems of the conventional technologies to find out that, in a gypsum-based embedding material comprising, as main components, calcined gypsum as a binder, cristobalite and quartz as heat-expandable refractory materials, and a non-heat-expandable refractory material, it is effective to blend the non-heat-expandable refractory material in a particular range and furthermore it is effective for the non-heat-expandable refractory material to have a particular average particle diameter, and have arrived at the present invention. The gypsum-based embedding material composition thus constituted is made so that the occurrence of cracks, breakage, damage, or the like is suppressed even in the case where casting is conducted by the "rapid heating" to say nothing of the case where the heating system in casting is the "usual heating". Furthermore, according to the studies made by the present inventors, a favorable casting with a good dimensional accuracy can be conducted with the gypsum-based embedding material composition for casting of the present invention constituted as described above even when applied to the resin pattern that disappears in longer time at a higher temperature than the conventional wax pattern, which is different from disappearance behavior of the conventional wax pattern.

Hereinafter, each material that constitutes the gypsum-based embedding material composition for casting of the present invention is described.

(Calcined Gypsum)

Calcined gypsum is a ½ hydrate of calcium sulfate [$CaSO_4 \cdot \frac{1}{2}H_2O$] and an anhydride of calcium sulfate [$CaSO_4$], and examples of the calcined gypsum include β type hemihydrate gypsum, α type hemihydrate gypsum, and calcium sulfate anhydrite III, or a mixture thereof. Any calcined gypsum can be used for the present invention, however it is more preferable to use the α type hemihydrate gypsum taking the required strength of the mold during casting into consideration. The calcined gypsum chemically reacts with water to be easily changed to the hemihydrate gypsum and therefore is used as a binder. Slurry obtained by adding an appropriate amount of water to the gypsum-based embedding material composition for casting of the present invention and kneading the resultant mixture is immediately solidified when injected into a form using, as a core, a wax or resin pattern with an intended impression of the teeth. Thereafter, when the gypsum-based embedding material composition for casting of the present invention is calcined at a high temperature, the pattern disappears to form a mold. The gypsum-based embedding material composition for casting of the present invention comprises gypsum as a main component and therefore have advantages that: the slurry is excellent in fluidity during injection into the form; the mold to be obtained provides less deformation due to residual stress after calcination; furthermore taking out a cast after casting is easy; and also provides less change with time. In the gypsum-based embedding material composition for casting of the present invention, the blending ratio of the calcined gypsum is not particularly limited, however when the blending ratio of the calcined gypsum is set so as to be 25 to 40 parts by mass, more preferably 25 to 35 parts by mass in the case where the total amount of the main components comprising the calcined gypsum, the cristobalite and the quartz, and the non-heat-expandable refractory material is 100 parts by mass, it becomes possible to more stably and favorably suppress the occurrence of cracks or breakage in the formed mold.

(Cristobalite and Quartz)

Any of cristobalite and quartz that have been utilized as a refractory material (heat resistant material) in the conventional "gypsum-based embedding material" can be used as the cristobalite and the quartz that constitute the gypsum-based embedding material composition for casting of the present invention. Namely, these refractory materials are heat-expandable refractory materials and are used for the purpose of enhancing the strength of a mold to be formed and compensating for the contraction in casting a metal intended to be cast. The characteristic of the present invention exists in that a non-heat-expandable refractory material as described next in addition to these heat-expandable refractory materials is contained in a blending amount of at least 10 to 25 parts by mass in the case where the total amount of the main components comprising the aforementioned calcined gypsum (binder), the cristobalite and the quartz (heat-expandable refractory materials), and the non-heat-expandable refractory material is 100 parts by mass. Therefore, in the gypsum-based embedding material composition for casting of the present invention, the blending ratios of the cristobalite and the quartz become relatively smaller than those of the conventional gypsum-based embedding material composition for casting. Specifically, the blending ratios of the cristobalite and the quartz are not particularly limited, however when the blending ratios are set, for example, so that 25 to 40 parts by mass of the calcined gypsum, 15 to 40 parts by mass, more preferably 20 to 35 parts by mass of the cristobalite, and 15 to 30 parts by mass, more preferably about 20 to about 30 parts by mass of the quartz are contained in the case where the total amount of the main components comprising the calcined gypsum (binder), the cristobalite and the quartz (heat-expandable refractory materials), and the non-heat-expandable refractory material is 100 parts by mass, the occurrence of cracks or breakage in the formed mold is more favorably and stably suppressed, and the obtained mold has a desired size and a favorable surface state. Moreover, it is preferable that the cristobalite and the quartz used in the present invention have an average particle diameter of 5 to 20 μm similar to the non-heat-expandable refractory material described later. In the gypsum-based embedding material composition for casting of the present invention, the aforementioned effects of the present invention can be obtained more remarkably by setting the particle size of the heat-expandable refractory material and the particle size of the non-heat-expandable refractory material that is used together with the heat-expandable refractory material to about the same extent.

(Non-Heat-Expandable Refractory Material)

As described above, the gypsum-based embedding material composition for casting of the present invention is characterized in that a part of the main components is constituted from the non-heat-expandable refractory material having an average particle diameter of 5 to 20 μm and furthermore the gypsum-based embedding material composition for casting of the present invention is constituted so that the blending amount of the non-heat-expandable refractory material is 10 to 25 parts by mass in the case where the total amount of the main components is 100 parts by mass. It is more preferable that the blending amount of the non-heat-expandable refractory material may be about 10 to about 20 parts by mass. The aforementioned remarkable effects of the present invention are obtained by using the non-heat-expandable refractory material having the average particle diameter specified in the present invention and blending the non-heat-expandable refractory material as one of the main components in a range as described above. Namely, when the average particle diameter of the non-heat-expandable refractory material becomes less than 5 μm, trouble arises such that cracks due to heat shock occur to the mold or burrs occur to the cast, on the other hand, when the average particle diameter of the non-heat-expandable refractory material becomes more than 20 μm, roughness occurs on the surface of the cast and the cast having a smooth and glossy surface state cannot be obtained. Moreover, when the blending amount of the non-heat-expandable refractory material is less than 10 parts by mass, the ratio of the heat-expandable refractory material in the blended refractory material increases, the expansion becomes too large, and the cracks occur to the mold due to the shortage in the strength of the mold, and when the blending amount of the non-heat-expandable refractory material is more than 25 parts by mass, the mold runs short of the expansion and the cast having a desired size cannot be obtained.

Specific examples of the non-heat-expandable refractory material that characterizes the present invention include fused silica (also called as silica glass, fused quartz, or quartz glass), mullite ($Al_6O_{13}Si_2$), zircon ($ZrSiO_4$), and alumina ($Al_2O_3$), and it is preferable to use one or more selected from the group thereof. Any of these refractory materials has a high melting point, exhibits excellent heat resistance, and functions as a refractory material, but is a non-heat expandable refractory material different from cristobalite and quartz being the heat-expandable refractory materials that have generally been used in the past, and is not suitable for an intended purpose of compensating for the coefficient of contraction of a metal.

The present inventors have made diligent studies on the combination of the "gypsum-based embedding material" that is capable of forming a mold excellent in dimensional accuracy not only in the case of a wax pattern but also, in particular, in the case of a resin pattern, and furthermore that is capable of forming a mold or a cast in a favorable state where cracks, breakage, damage, or the like that has a high risk of occurrence when the rapid heating is conducted. As a result thereof, the present inventors have found that it is effective to use a non-heat-expandable refractory material as a refractory material that constitutes the main components within a blending range of 10 to 25 parts by mass. Namely, the non-heat-expandable refractory material, although being non-heat-expandable, can sufficiently compensate for the coefficient of contraction of the metal to form a mold by pouring into the mold when used within the above-described range, and besides can effectively prevent the occurrence of cracks, breakage, damage, or the like that has been liable to occur due to too much expansion. Particularly, it has been confirmed that more excellent effects are obtained as described previously by making the non-heat-expandable refractory material to be used have a particle diameter in a range of 5 to 20 μm.

The conventional "gypsum-based embedding material" composition comprises, for example, the α type hemihydrate gypsum, the quartz, and the cristobalite as main blended components each blended about one third of the total amount of the main blended components. And the coefficient of expansion of the embedding material required to compensate for the coefficient of contraction of a metal to be used for casting is taken as "coefficient of curing expansion (at the time of being placed in a furnace)"+"coefficient of thermal expansion"="total coefficient of expansion", and the detailed blending is determined based on the equation. The coefficient of curing expansion is obtained mainly by the expansion of α type hemihydrate gypsum associated with its hydration and slightly by the expansion attributable to the swelling of the cristobalite and the quartz. On the other hand, the "coefficient of heat expansion" is obtained mainly by the thermal change in the cristobalite and the quartz, and the contribution of the cristobalite is the largest. Since cracks, breakage, or the like is liable to occur when expansion attributable to the cristobalite is too large (the blending amount of the cristobalite is too large), accordingly, it is taken that it is necessary to reduce the relative amount of the cristobalite which exhibits larger expansion than the embedding material to be used for the usual heating in order to make the property of the "gypsum-based embedding material" applicable to the rapid heating.

The present inventors have made studies on the difference of behavior at the time of heating between the aforementioned resin pattern that has begun to be used in recent years and the conventional wax pattern. As a result thereof, it has been found that the behavior at the time of heating is totally different from each other as will be described later such that the wax which constitutes the wax pattern has a melting point of about 100° C., therefore dewaxing is easily conducted, and the wax is easily vaporized to disappear, while the resin which constitutes the resin pattern is not easily melted when heated and is disappeared through carbonization by raising the temperature. Since the resin, as described above, disappears through carbonization, the resin has a property to expand at the time of disappearance through carbonization when a carbide is left because of insufficient incineration, and therefore it is considered that damage of the mold may occur attributable to the property. According to the studies made by the present inventors, the wax pattern melts at around 70° C. and completely disappears at 560° C. via carbonization, while the resin pattern is softened at around 420° C. (begins to lose its shape) and is vaporized and disappears gradually (becomes small) to completely disappear at 660° C., and the behavior of the resin pattern is much different from the behavior of the wax pattern. The present inventors have recognized in the process of the above-described studies that an idea which is totally different from the conventional "gypsum-based embedding material" composition becomes necessary in the case where the purpose is set to provide a "gypsum-based embedding material" suitable for the resin pattern and furthermore suitable for the case where casting is conducted using a resin pattern by the rapid heating system.

It has sometimes occurred in the past that the resin is used as an auxiliary member of the wax pattern in the case of using the "gypsum-based embedding material", in this case, however, when the rapid heating becomes necessary, a method has been adopted in which a part made of the resin is coated with wax to cope with heat shock. Against the above-described circumstances, the present inventors have made it possible, by finding the novel "gypsum-based embedding material" composition specified in the present invention, to form a favorable mold: to which a resin pattern is adaptable as it is without adopting such a complex method as described above; and furthermore in which cracks, breakage, damage, or the like is suppressed even in the case where casting is conducted using a resin pattern by the rapid heating system, and furthermore to form a favorable cast.

The present inventors consider as follows the reason that the effects of the present invention are obtained by, as described above, the particular non-heat-expandable refractory material being contained as specified in the present invention. In order to make it possible to conduct the rapid heating in the case of using the "gypsum-based embedding material", it is necessary to enhance the strength of the gypsum-based embedding material more than in the case of the usual heating system. On the other hand, as described previously, since the embedding material is required to have a desired coefficient of expansion to compensate for the contraction of a metal, it is taken as usual that the heat-expandable refractory material such as cristobalite and quartz is used as a refractory material, however it is known that breakage becomes liable to occur when the expansion of cristobalite in particular is too large (the blending amount of the cristobalite is too large). The present inventors have made diligent studies to intend to provide a "gypsum-based embedding material" that is not only applicable to the resin pattern but also adaptable to the rapid heating and, as a result thereof, have recognized that sufficient effects are not stably obtained either by adjusting the coefficient of expansion by the blending amount of the quartz or by the above-listed conventional technology in which the constitution is made by further adding various types of substances to the cristobalite and the quartz. Furthermore, the present inventors have noticed that the disappearance behavior of the resin pattern at the time of heating is much different from that of the wax pattern and have made detailed studies on the "gypsum-based embedding material" composition from these standpoints.

As described previously, being different from the wax pattern that is faithfully formed by a technician into a mold by hand from a dental gypsum model formed by molding a patient's teeth, the resin pattern is formed by outputting, by a 3D printer, an image data as a stereo image based on the image data obtained from the dental gypsum model by utilizing the image analysis technology. Therefore, the present inventors have noticed a point that the resin pattern can easily be formed in a state where the coefficient of expansion of a metal is added into consideration in the process of making the image data. Namely, the present inventors have noticed that when the resin pattern the size of which is appropriately adjusted is formed by making use of this point, the use amount of the heat-expandable refractory material such as cristobalite, quartz, and so on can be reduced more than the use amount in the conventional gypsum-based embedding material, it becomes possible to use a material exhibiting more excellent fire resistant property or strength in place of the conventional refractory material, and the range of material selection becomes wider. So, the present inventors have made diligent studies on application of various materials and, as a result thereof, have found that: it is effective to utilize the non-heat-expandable refractory material having a particular average particle diameter within a particular range; and thereby the gypsum-based embedding material that is adaptable to the rapid heating as well as the resin pattern and with which cracks, breakage, damage, or the like does not occur in the mold is obtained. Furthermore, the resin pattern disappears more slowly at a higher temperature when compared with the wax pattern, however also with regard to this point, the present inventors have confirmed that the gypsum-based embedding material becomes also applicable to the resin pattern by making the constitution with the non-heat-expandable material being contained within a particular range and a favorable cast that is excellent in dimensional accuracy can be formed. Specific examples of the non-heat-expandable refractory material used in the present invention include, for example, fused silica, mullite, zircon, and alumina which are listed previously, however according to the studies made by the present inventors it is particularly preferable to use fused silica or mullite.

To the gypsum-based embedding material composition for casting of the present invention, for example, a curing adjusting agent such as an accelerator and a retarder, or a dispersant or the like for adjusting the fluidity of the slurry comprising an embedding material composition can appropriately be added as necessary within a range that does not impair the expected purposes of the present invention in addition to the main components.

EXAMPLES

Hereinafter, the present invention will be described specifically giving Examples and Comparative Examples. Here, examples in which a dental prosthesis is cast using the gypsum-based embedding material composition for casting of the present invention are shown, however the range to which the embedding material composition of the present invention can be applied is not limited to use for dental casting, and, with regard to the object, the gypsum-based embedding material composition for casting of the present invention is applicable to a cast that has conventionally been able to be cast by the lost wax method using calcined gypsum as a binder, the cast including, for example, jewelry, fine arts and crafts, parts, or the like having a sophisticated and complicated shape. In addition, "parts" described below is based on mass unless otherwise noted.

Examples 1 to 4, and Comparative Examples 1 and 2

(Preparation of Samples)

Each raw material the particle size of which is adjusted as listed below was used to prepare each "gypsum-based embedding material" of Examples and Comparative Examples. In addition, in the followings, the particle size measurement for each raw material was conducted using a Microtrack HRA (product name) manufactured by Nikkiso Co., Ltd.
(Binder)
Calcined Gypsum Calcined gypsum obtained by pulverizing an α type hemihydrate gypsum raw material (manufactured by Yoshino Gypsum Co., Ltd.), the calcined gypsum having an average particle diameter of 30 μm was used.
(Heat-Expandable Refractory Materials)
Cristobalite Cristobalite obtained by pulverizing a cristobalite raw material (commercial product), the cristobalite having an average particle diameter of 12 μm was used.
Quartz Quartz obtained by pulverizing a quartz raw material, the quartz having an average particle diameter of 15 μm was used.
(Non-Heat-Expandable Refractory Materials)
Fused Silica A Fused silica obtained by pulverizing a fused silica raw material, the fused silica having an average particle diameter of 3 μm was used as fused silica A.

Fused Silica B

Fused silica obtained by pulverizing the same fused silica raw material as used for the fused silica A, the fused silica having an average particle diameter of 5 μm was used as fused silica B.

Fused Silica C

Fused silica obtained by pulverizing the same fused silica raw material as used for fused silica A, the fused silica having an average particle diameter of 17 μm was used as fused silica C.

Fused Silica D

Fused silica obtained by pulverizing the same fused silica raw material as used for fused silica A, the fused silica having an average particle diameter of 20 μm was used as fused silica D.

Fused Silica E

Fused silica obtained by pulverizing the same fused silica raw material as used for fused silica A, the fused silica having an average particle diameter of 25 μm was used as fused silica E.

Mullite

Mullite obtained by pulverizing a mullite raw material, the mullite having an average diameter of 15 μm was used.

(Manufacturing of Resin Pattern)

A crown pattern was manufactured using a crown pattern abutment tooth model of A. D. A. specification testing No. 2 test specimen and was used as a resin pattern for evaluating the "gypsum-based embedding material".

<Evaluation>

(Evaluation Methods)

Each gypsum-based embedding material composition for casting of Examples 1 to 4 and Comparative Examples 1 and 2 having a combination shown in Table 1 was manufactured using each raw material described previously. To 100 parts by mass of each of the obtained gypsum-based embedding material compositions for casting, 33% of kneading water was added, and the resultant mixture was stirred in vacuum for 30 seconds to obtain slurry of each embedding material composition. A ring having a height of 50 mm and an inner diameter of 40 mm was lined by a liner having a thickness of 0.7 mm, then the resin pattern manufactured previously was implanted therein, and the slurry prepared as described above was poured into the ring. The ring was placed in a furnace the temperature of which was raised to 720° C. after 30 minutes from the start of the mixing, moored for 40 minutes, and thereafter casting was conducted using gold-palladium alloy. With regard to the obtained mold comprising the embedding material and the obtained cast, the following items were each tested and evaluated according to the following criteria.

(Evaluation Items and Evaluation Methods)

(Heat Shock)

The occurrence of cracks in the obtained molds was visually confirmed, then the mold in which cracks had occurred was evaluated as "Poor", and the mold in which cracks had not occurred was evaluated as "Good", and the results are shown in Table 1.

(Size of Casts)

Each cast obtained was inserted into the crown pattern abutment tooth model of A. D. A specification testing No. 2 test specimen, and the fitting state was confirmed. Relative evaluation was conducted, then the cast that fitted favorably was evaluated as "Excellent", the cast that fitted was evaluated as "Good", and the cast that did not fit was evaluated as "Poor", and the results are shown in Table 1.

(Surface State of Casts)

The cast the surface of which was smooth and glossy was evaluated as "Good", the surface of which was rough or had burrs was evaluated as "Poor", and the results are shown in Table 1.

TABLE 1

Formulations and Evaluation Results of Embedding Materials

| | Examples | | | | Comparative Examples | |
|---|---|---|---|---|---|---|
| | 1 | 2 | 3 | 4 | 1 | 2 |
| Calcined gypsum | 30 | 30 | 30 | 30 | 30 | 30 |
| Cristobalite | 35 | 35 | 30 | 30 | 40 | 25 |
| Quartz | 25 | 20 | 20 | 15 | 25 | 15 |
| Fused silica C (17 μm) | 10 | 15 | 20 | 25 | 5 | 30 |
| Heat shock | Good | Good | Good | Good | Poor | Good |
| Size of cast | Excellent | Excellent | Excellent | Good | Good | Poor |
| Surface state of cast | Good | Good | Good | Good | Poor | Good |

As shown in Table 1, the fused silica C was added in a range of 10 to 25 parts by mass to each of the embedding materials of Examples 1 to 4, however, in any case where any of the embedding materials was used, it was able to be confirmed that the cracks due to heat shock did not occur in the mold, a cast having a desired and favorable size was made, and the surface of the cast became smooth and glossy. On the other hand, in the case where the embedding material of Comparative Example 1 the addition amount of the fused silica C of which was less than the amount specified in the present invention was used, the blending amount of the heat-expandable refractory materials was increased and the expansion became too large, and therefore the strength of the mold was insufficient causing cracks to occur in the mold, and burrs occurred in the cast. Moreover, in the case where the embedding material of Comparative Example 2 the addition amount of the fused silica C of which was larger than the amount specified in the present invention was used, the expansion of the mold was insufficient and the cast was made small.

Each gypsum-based embedding material composition for casting of Examples 5 to 7 and Comparative Examples 3 and 4 having a composition shown in Table 2 was manufactured using each raw material described previously. Evaluation was conducted in the same manner as described previously using: the prepared molds comprising the gypsum-based embedding material composition for casting; and the casts, and the results are shown in Table 2.

TABLE 2

Formulations and Evaluation Results of Embedding Materials

|  | Examples | | | Comparative Examples | |
| --- | --- | --- | --- | --- | --- |
|  | 5 | 6 | 7 | 3 | 4 |
| Calcined gypsum | 30 | 30 | 30 | 30 | 30 |
| Cristobalite | 35 | 35 | 35 | 35 | 35 |
| Quartz | 20 | 20 | 20 | 20 | 20 |
| Fused silica A (3 μm) | — | — | — | 15 | — |
| Fused silica B (5 μm) | 15 | — | — | — | — |
| Fused silica D (20 μm) | — | 15 | — | — | — |
| Fused silica E (25 μm) | — | — | — | — | 15 |
| Mullite (15 μm) | — | — | 15 | — | — |
| Heat shock | Good | Good | Good | Poor | Good |
| Size of cast | Excellent | Excellent | Good | Excellent | Excellent |
| Surface state of cast | Good | Good | Good | Poor | Poor |

As shown in Table 2, it was confirmed that cracks due to heat shock did not occur in the molds and the casts were made such that each size was favorable and each surface was smooth and glossy by using the embedding materials of Examples 5 and 6 obtained by respectively blending the fused silica B and D having an average particle diameter of 5 and 20 μm respectively in place of the fused silica C used for preparing the embedding material of Example 2, which was similar to the case where the embedding material of Example 2 was used. Moreover, it was confirmed that cracks due to heat shock did not occur in the mold and the cast was made such that the size was favorable and the surface was smooth and glossy by using the embedding material of Example 7 in which mullite was blended, which was similar to the case where the embedding material of Example 2 was used. In the case where the embedding material of Comparative Example 3 in which the fused silica A having an average particle diameter of 3 μm was blended in place of the fused silica C was used, as shown in Table 2, cracks due to heat shock occurred in the mold, and burrs occurred on the surface of the cast. Moreover, in the case where the embedding material of Comparative Example 4 in which the fused silica E having an average particle diameter of 25 μm was blended was used, it was confirmed that cracks due to heat shock did not occur in the mold, the cast is made such that the size was favorable, however the surface of the cast became rough.

INDUSTRIAL APPLICABILITY

According to the present invention, a technology is provided: that is applicable to, to say nothing of, a conventional wax pattern; by which technology a favorable cast having a good dimensional accuracy can be obtained in the case where the technology is, although utilizing a "gypsum-based embedding material", applied to a resin pattern the evolution of which has been expected in recent years, and furthermore a technology is provided: by which technology cracks or breakage does not occur in a mold; by which technology burrs and roughness is not present on the surface of a cast; by which technology the surface of the cast is smooth and glossy; and by which technology a cast having a desired size can be produced in a good yield; even in the case where a cast is prepared by a "rapid heating" system in which heat shock is large, the "rapid heating" system being conducted for the purpose of enhancing the treatment efficiency, and therefore the utilization of the technology is expected.

The invention claimed is:

1. A gypsum-based embedding material composition for casting, comprising, as main components:
    calcined gypsum as a binder;
    cristobalite and quartz as heat-expandable refractory materials; and
    a non-heat-expandable refractory material having an average particle diameter in a range from 5 to 20 μm,
    wherein from 25 to 40 parts by mass of the calcined gypsum, from 15 to 40 parts by mass of the cristobalite, from 15 to 30 parts by mass of the quartz, and from 10 to 25 parts by mass of the non-heat-expandable refractory material are contained in the composition, relative to a total amount of the main components in the composition as 100 parts by mass.

2. The gypsum-based embedding material composition for casting according to claim 1,
    wherein the non-heat-expandable refractory material is one or more materials selected from the group consisting of fused silica, mullite, zircon, and alumina.

3. The gypsum-based embedding material composition for casting according to claim 1,
    wherein both of the cristobalite and the quartz have an average particle diameter in a range from 5 to 20 μm.

4. The gypsum-based embedding material composition for casting according to claim 1,
    wherein the blending ratios of respective main components in the composition are from 25 to 35 parts by mass for the calcined gypsum, from 20 to 35 parts by mass for the cristobalite, from 20 to 30 parts by mass for the quartz, and from 10 to 25 parts by mass for the non-heat-expandable refractory material, relative to the total amount of the main components as 100 parts by mass.

5. The gypsum-based embedding material composition for casting according to claim 1,
    wherein the gypsum-based embedding material composition for casting is for dental casting.

6. The gypsum-based embedding material composition for casting according to claim 1, wherein the gypsum-based embedding material composition for casting is for applying to a resin pattern being output as a stereo image using a 3D printer.

* * * * *